United States Patent [19]
Auld et al.

[11] Patent Number: 5,154,197
[45] Date of Patent: Oct. 13, 1992

[54] CHEMICAL CLEANING METHOD FOR STEAM GENERATORS UTILIZING PRESSURE PULSING

[75] Inventors: Gregg D. Auld, Trafford; Allen J. Baum, Pittsburgh; Judith B. Esposito, Swissvale; William J. Stenger, Penn Twp., all of Pa.

[73] Assignee: Westinghouse Electric Corp., Pittsburgh, Pa.

[21] Appl. No.: 772,137

[22] Filed: Oct. 9, 1991

Related U.S. Application Data

[63] Continuation of Ser. No. 524,799, May 18, 1990, abandoned.

[51] Int. Cl.$^5$ .......................... B08B 3/08; B08B 3/12; B08B 5/00; B08B 9/02
[52] U.S. Cl. .......................................... 134/1; 134/10; 134/17; 134/21; 134/22.11; 134/22.12; 134/22.18; 134/37
[58] Field of Search ............... 134/1, 10, 17, 21, 22.11, 134/22.12, 22.18, 37

[56] References Cited

U.S. PATENT DOCUMENTS

| | | |
|---|---|---|
| 3,033,710 | 5/1962 | Hightower et al. |
| 3,447,965 | 6/1969 | Teumac. |
| 4,320,528 | 3/1982 | Scharton et al. |
| 4,645,542 | 2/1987 | Scharton et al. .......................... 134/1 |
| 4,655,846 | 4/1987 | Scharton et al. |
| 4,699,665 | 10/1987 | Scharton et al. .......................... 134/1 |
| 4,750,547 | 6/1988 | Sakamoto. |
| 4,899,697 | 2/1990 | Franklin et al. .......................... 165/95 |

OTHER PUBLICATIONS

Report EPRI NP-6356-M Entitled "Qulification of PWR steam generator chemical cleaning for Indian Point-2", Prepared by Westinghouse Electric Corporation and Pacific Nuclear Services, May 1989.

*Primary Examiner*—Theodore Morris
*Assistant Examiner*—Zeinab El-Arini

[57] ABSTRACT

An improved method for removing sludge and corrosion products from the interior of a heat exchanger vessel, such as a nuclear steam generator, which comprises the steps of generating a series of pressure pulses within a liquid chelate-containing chemical cleaning agent after the agent has been introduced into the interior of the vessel to create shock waves in the liquid for dislodging, dissolving and fluidizing sludge and corrosion products. The liquid chemical cleaning agent is removed from the vessel after only about 10 to 70 percent of what would have been its normal residence time without the pressure pulses. The method further includes the steps of simultaneously recirculating the chemical cleaning agent through a filter assembly during the pressure pulsing operation in order to remove fluidized sludge and corrosion products dislodged by the pressure pulsing, thereby affording them no opportunity to resettle back onto the surfaces of the heat exchanger vessel and interfere with the chemical cleaning of the vessel. The method reduces not only the time required for a particular chemical cleaning agent to effectively clean the vessel, but further reduces the number of times such chemicals need to be introduced into the vessel, which in turn results in the production of less radioactive liquid waste products.

27 Claims, 3 Drawing Sheets

CHEMICAL CLEANING METHOD FOR STEAM GENERATORS UTILIZING PRESSURE PULSING

This application is a continuation of Ser. No. 07/524,799, filed May 18, 1991, now abandoned.

BACKGROUND OF THE INVENTION

This invention generally relates to an improved method for removing sludge and corrosion products from the interior of a heat exchanger vessel, which may be a nuclear steam generator, wherein a series of pressure pulses is generated within a liquid chemical cleaning agent after it has been introduced into the vessel to enhance chemical cleaning by dislodging, dissolving or fluidizing sludge and corrosion products within the vessel.

Methods for chemically cleaning the interior of heat exchanger vessels such as nuclear steam generators are known in the prior art. However, before the purpose and operation of such cleaning methods may be understood, some basic understanding of the structure and maintenance problems associated with nuclear steam generators is necessary.

Nuclear steam generators generally comprise a bowl-shaped primary side through which hot, radioactive water from the reactor core is circulated, a secondary side disposed on top of the primary side into which non-radioactive water is fed, and a tubesheet which includes a number of U-shaped heat exchanger tubes disposed between the primary and secondary sides of the generator for thermally connecting but hydraulically insulating the primary and secondary sides so that heat from the radioactively contaminated water in the primary side will be conducted to the non-radioactive water in the secondary side, thereby causing it to boil and to create non-radioactive steam.

The U-shaped heat exchanger tubes are contained within the secondary side of such steam generators. Each such heat exchanger tube is inverted, with its open ends mounted in the tubesheet and its legs and bent portion extending into the secondary side. A plurality of spaced apart support plates are provided in the secondary side for laterally supporting the legs of each heat exchanger tube. The legs of the U-shaped heat exchanger tubes extend through bores present in these support plates. Small, annular spaces are present between these heat exchanger tubes and the bores in the support plates and tubesheet through which these tubes extend. These annular spaces which are known in the art as "crevice regions". Such crevice regions provide only a very limited flow path for the feed water that circulates throughout the secondary side of the steam generator, which in turn can cause the feed water to boil so rapidly in these regions that they can actually dry out. This chronic drying-out causes impurities in the water to plate out and collect in these crevice regions. These impurities may promote the occurrence of sludges and corrosion on the exterior surfaces of the tubes, and the resulting corrosion products can, over time, accumulate in the crevice to the point where they can actually dent the heat exchanger tubes. Even though the heat exchanger tubes are made from corrosion-resistant Inconel 600 or 690, if the resulting impurities and sludges are not removed, sufficient corrosion and stress can occur in the crevice region areas of these tubes to ultimately cause them to crack unless some sort of maintenance operation is undertaken. Since a cracked heat exchanger tube can cause radioactive materials from the primary side to contaminate the non-radioactive water in the secondary side of the generator, it is important that maintenance operations are implemented which prevent such corrosion and subsequent cracking from occurring.

Chemical cleaning methods were developed in the prior art to dissolve such sludge accumulation, and to ameliorate corrosion. In these methods, the nuclear steam generator is first taken out of service and completely drained of water from both the primary and the secondary sides. Next, as most of the corrosion products contained within the crevice regions are iron oxide and copper that have become tightly ensconced in the crevice regions or on the surfaces of heat exchanger tubes, chelate-containing iron removal solvents and copper removal solvents are sequentially introduced into the interior of the secondary side to dissolve and remove them. Such iron removal solvents typically include an aqueous mixture of EDTA (ethylenediaminetetraacetic acid), hydrazine, ammonium hydroxide ($NH_4OH$), and an inhibitor for retarding corrosion reactions between the metal surfaces in the generator and the EDTA, known in the trade as CCI-801 available from Petrolite, Inc., located in St. Louis, Missouri. The copper solvent likewise includes an aqueous mixture of EDTA and $NH_4OH$, and further includes hydrogen peroxide ($H_2O_2$) and EDA (ethylene diamine).

While such copper and iron solvents have proven to be effective in removing iron oxide and copper from the interior of the secondary side of a nuclear steam generator, they are also capable of promoting new corrosion within the steam generator despite the use of an inhibitor, particularly among the carbon steel and low alloy steel components of the generator. To minimize these corrosive effects, these solvents are typically provided with low concentrations of their active chelate ingredients. Unfortunately, the use of such low concentrations protracts the time it takes for these agents to work, and often necessitates exposing the interior of the secondary side to multiple solvent baths. For example, in one of the most common prior art cleaning methods it is necessary to introduce and to remove an iron solvent twice within the steam generator, and to introduce and to remove a copper solvent as many as six times. Such multiple solvent baths, along with the various rinse cycles which they necessitate, can cause a single chemical cleaning operation of a steam generator to last one hundred and twenty hours or more. As a utility may typically lose one million dollars in revenues for each day of down time of a nuclear steam generator, it can readily be appreciated that the cost of such a state of the art cleaning operation is quite high, particularly when one considers that the total price of such an operation must also include the cost of the chemicals, the setting up of the recirculation equipment. Further compounding these costs is the fact that the spent iron and copper solvents and rinse solutions that are removed from the radioactive interior of the secondary side of the generator constitute a large volume of radioactive liquid waste which must be disposed of.

Still another shortcoming associated with chemical cleaning operations is the fact that such operations may not be entirely effective in removing tightly ensconced iron oxide and copper impurities from all of the numerous crevice regions within the secondary side of the generator. The applicants have observed that part of this ineffectiveness results from the fact that tightly packed impurities in small spaces do not give the chemical solvent a sufficient opportunity to penetrate and to come into contact with large areas of the surface of such impurities. The applicants have reason to believe that the insoluble fractions of the sludge and other impurities collect as residues at the surfaces of these tightly ensconced deposits during the cleaning operation and hinder the penetration of the chemical cleaning solution beyond the surface of the deposit, thereby stopping or at least significantly retarding the dissolution of the deposits in the crevice regions.

Clearly, what is needed is an improved chemical cleaning method which is faster and more effective than prior art methods. Ideally, such a method would not generate the large volumes of liquid waste associated with the prior art. Finally, it would be desirable if the improved method reduced the probability that the cleaning agents would promote the occurrence of new corrosion within the steam generator.

SUMMARY OF THE INVENTION

Generally speaking, the invention is an improved method for chemically removing sludge and corrosion products from the interior of a heat exchanger such as a nuclear steam generator that eliminates or at least ameliorates the aforementioned limitations and shortcomings of the prior art. The method generally comprises the steps of generating a series of pressure pulses within a liquid, chelate-containing chemical cleaning agent after the agent has been introduced into the interior of the heat exchanger vessel to create shock waves and displacements in the liquid that dislodge, dissolve and fluidize sludge and corrosion products, and then removing the cleaning agent after 10 to 70 percent of what its normal residence time would have been. This shortening of the residence time of the chelate-containing cleaning agent advantageously reduces the probability that the chemical agent itself will produce any internal corrosion within the vessel by a factor which is greater than the percentage that the residence time is reduced.

In prior art chemical cleaning processes, it is necessary to introduce and to remove chemical cleaning agents a number of times before the sludge and corrosion products have been effectively removed from the interior of the heat exchanger vessel. In the improved method of the invention, such chemical cleaning agents are introduced and removed only about half as many times as in the prior art due to the enhancement of the cleaning efficacy of the chemical agents caused by the pressure pulsing. This reduction in the number of times that a chemical cleaning agent is introduced and removed from the heat exchanger vessel advantageously produces about half as much radioactively contaminated liquid waste as prior art chemical cleaning processes.

In the preferred method of the invention, the chemical cleaning agent is simultaneously recirculated through a filtration system located outside of the vessel of the heat exchanger while pressurized pulses of gas are introduced into the cleaning agent within the vessel. Such recirculation and filtration advantageously removes fluidized sludge and corrosion products from the agent during the cleaning operation, thereby denying the opportunity to re-settle back down onto the tubesheet or crevice regions within the heat exchanger, which in turn would interfere with the chemical cleaning of the surfaces. When rinsing agents are used to remove residual cleaning agents from the interior of the heat exchanger vessel, the same recirculation and pressure pulsing is preferably simultaneously implemented to remove further amounts of un-dissolved and fluidized sludge and corrosion products. Such pressure pulsing and recirculation further enhances the ability of such rinsing agents to thoroughly penetrate all of the crevice regions of the heat exchanger vessel.

The improved chemical cleaning method may further include the step of generating the pressure pulses in the chemical agent contained within the heat exchanger vessel with an oxygen containing gas whenever a cleaning agent requiring chemical oxidation is used, such as the copper cleaning solvent EDTA.

The pressure pulses are preferably created by injecting pulses of gas into the liquid chemical agent at a pressure of between about 300 and 900 psi, the pressure increasing as the chemical cleaning agent fills the vessel. The use of such pressures insures the creation of near-explosive shock waves and liquid displacement which are capable of breaking up encrustations of sludge and corrosion products in the crevice regions of the heat exchanger vessel, which in turn helps the chemical cleaning agent to envelope and dissolve or at least dislodge and fluidize these materials.

BRIEF DESCRIPTION OF THE SEVERAL FIGURES

DETAILED DESCRIPTION OF THE PREFERRED EMBODIMENT

Figure 1:
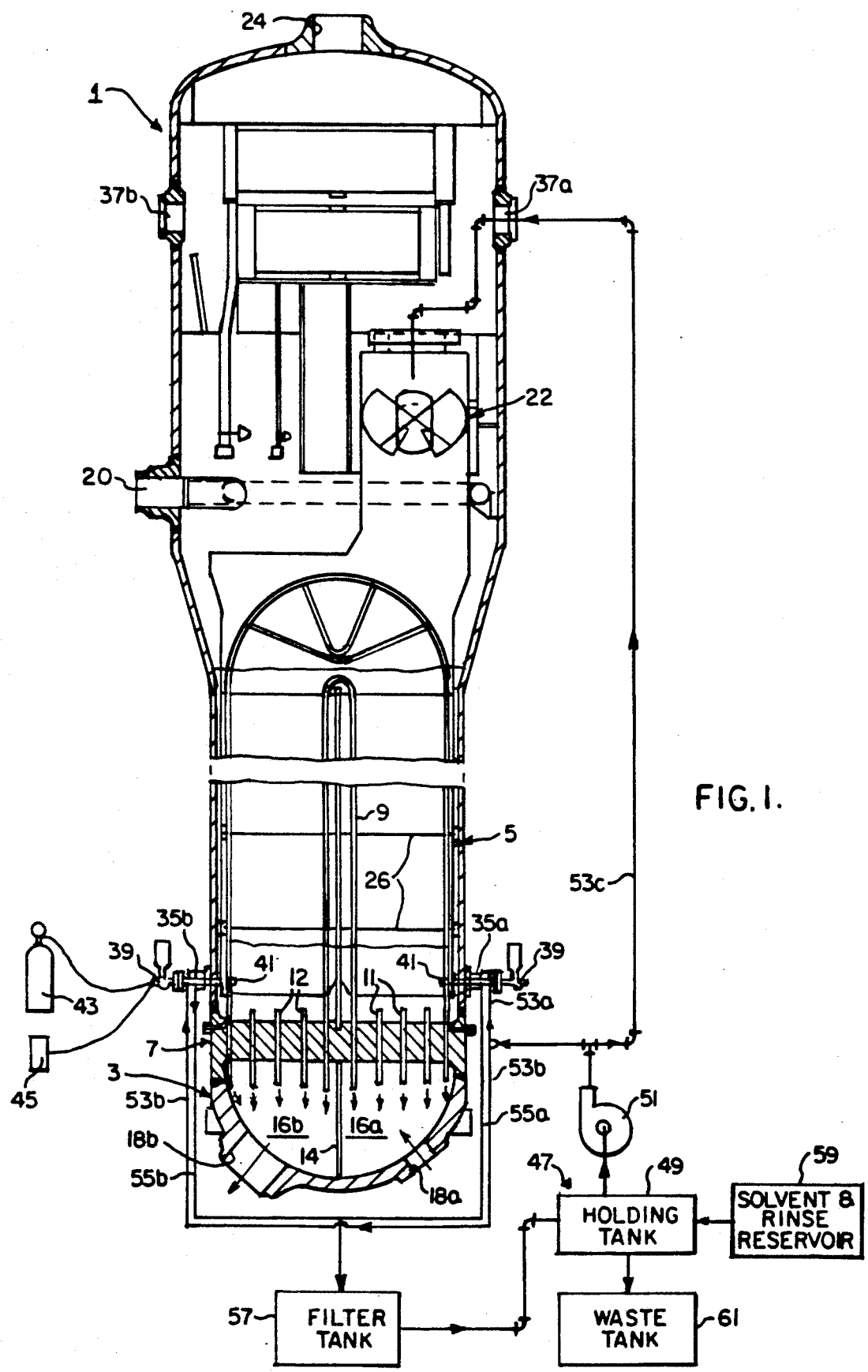
FIG. 1 is a cross-sectional side view of a steam generator and a generalized, schematic diagram of the recirculation system used in connection with the improved chemical cleaning method of the invention.

With reference now to FIG. 1, the improved chemical cleaning method of the invention is particularly useful in cleaning the interior of a nuclear steam generator 1. Such generators 1 include a bowl-shaped primary side 3 at their bottom portions, and a cylindrically shaped secondary side 5 in their middle portions which are hydraulically separated by means of a tubesheet 7. Heat is conducted from the primary side 3 to the secondary side 5 through a number of heat exchanger tubes 9, each of which is shaped like an inverted U. Each tube 9 includes an inlet end 11 and an outlet end 12 which are mounted in bores in the tubesheet 7. A divider plate 14 divides the bowl-shaped primary side 3 into two quadrispherical chambers known as channel heads 16a,b in the art. The inlet ends 11 of all of the heat exchanger tubes 9 communicate with the right-hand channel head 16a, while the outlet ends 12 of all of these tubes 9 communicate with the left-hand channel head 16b. Manways 18a,b afford access to the channel head 16a,b respectively. In the secondary side, a feed water inlet 20 is provided for admitting non-radioactive and purified water over the bundle of U-shaped heat exchanger tubes 9 so as to immerse the same. Disposed above these tubes 9 is a steam drying assembly 22 which captures and returns water vapor entrained in the steam created by the generator 1 back into the feed water that immerses the heat exchanger tubes 9. An outlet port 24 at the top of the steam generator 1 conducts dry steam to the blades of a turbine that is connected to an electrical generator (not shown). Finally, a number of vertically spaced support plates 26 are disposed along the length of the secondary side 5 of the steam generator 1 for laterally supporting the legs of the U-shaped heat exchanger tubes 9. As is best seen in FIGS. 2A and 2B, each of these support plates 26 includes a plurality of bores 28 through which the heat exchanger tubes 9 extend.

In operation, hot radioactive water from the reactor core (not shown) is admitted into the channel head 16a, and from thence flows upwardly into the inlet ends 11 of each of the heat exchanger tubes 9. This hot water flows upwardly through the inlet legs of each of the tubes 9 (known as hot legs in the art), continues flowing around the bend of each of the tubes 9, and from there flows down through the outlet legs (known as cold legs) and from thence out through the outlet ends 12 of the heat exchanger tubes 9 and into the outlet channel head 16b, where it is ultimately recirculated back to the core of the reactor.

The hot, radioactive water from the primary side transfers much of its heat through the walls of the heat exchanger tubes 9 and into the non-radioactive water that surrounds these tubes 9. This causes the non-radioactive water to boil, and to create the steam which is ultimately conducted out of the outlet port 24 of the steam generator 1.

Figure 2A:
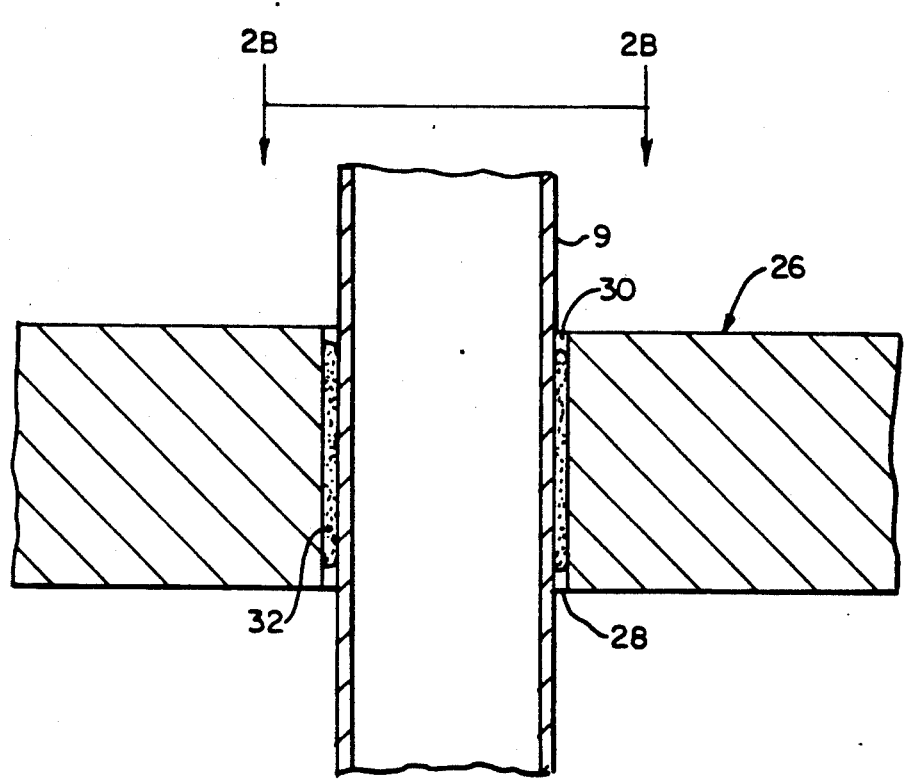
FIG. 2A is a cross-sectional side view of one of the heat exchanger tubes used in the steam generator illustrated in FIG. 1, showing how this tube extends through a bore in a support plate, and how sludge and corrosion products accumulate in the annular space between the tube and the bore in the support plate.
Figure 2B:
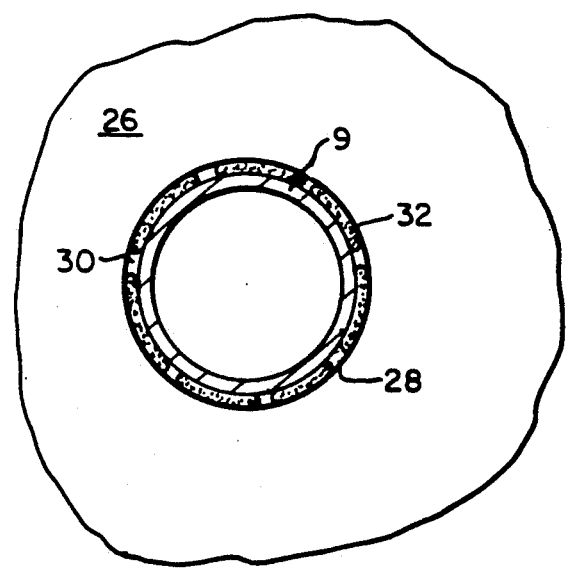
FIG. 2B is a plan view of the heat exchanger tube illustrated in FIG. 2A along the line 2B-B.

The manner in which sludge and corrosion products accumulate in the crevice regions of the steam generator 1 is best understood with reference to FIGS. 2A and 2B. Between the heat exchanger tubes 9 and the bores 28 in the support plates 26 is a narrow, annular space 30. This annular space 30 provides a relatively constricted flow path for the non-radioactive water that is in a constant state of circulation around these tubes 9 during the operation of the steam generator 1. The resulting limited circulation can allow water to boil out of the space faster than the surrounding ambient water can re-envelope the heat exchanger tube 9. As a result of this "dry boiling", any impurities present in the water in the secondary side are plated out onto the surfaces of this narrow annular space 30, forming deposits of sludge and debris 32. As this sludge and debris 32 accumulates, recirculation through the annular space 30 is further retarded, which in turn accelerates the accumulation of even more sludge and debris 32 in this region. Ultimately, such sludge and debris 32 can completely fill the annular space 30. Chemical analysis has shown that the primary components of the sludge and debris 32 include magnetite ($Fe_3O_4$), elemental copper, and copper oxide. Such sludge and debris accumulations can promote the occurrence of corrosion in the outer walls of the heat exchanger tubes 9 in the vicinity of the support plates 26, which in turn may cause these tubes 9 to crack, thereby contaminating the non-radioactive water of the secondary side 5 with the hot, radioactive water from the primary side 3 of the generator 1. The same destructive phenomenon can also occur in the annular spaces (not shown) between the bores in the tubesheet 7, and the outer walls of the heat exchanger tubes 9 that extend through these bores.

One of the principal purposes of the chemical cleaning method of the invention is to remove such sludge and debris 32 from crevice regions such as the annular space 30, along with the products of any corrosion which as sludge might have started. To this end, the method of the invention involves the generation of pressure pulses in liquid chemical cleaning agents introduced into the secondary side 5 of the steam generator 1 in order to loosen, dislodge and fluidize such sludge and debris 32 while the active compounds within the chemical cleaning agent dissolve the magnetite and copper compounds within such debris.

FIG. 1 illustrates the best mode of implementing the method of the invention, wherein both pressure pulse generators and a chemical recirculation system are installed within the lower hand holds 35a,b and upper manways 37 of the nuclear steam generator 1. More specifically, a pressure pulse generator 39 having a nozzle 41 for emitting a pressurized pulse of gas is detachably secured within each of the lower hand holds 35a,b. A source of pressurized gas 43, which may be a compressed bottle of nitrogen or air, is connected to each of the pressure pulse generators 39, as is a pulser control unit 45 Which periodically actuates the pulser generator 39 to discharge a volume of compressed nitrogen through the nozzle 41. In the preferred method, each of the pressure pulse generators 39 is a PAR 600 B air gun manufactured by Bolt Technology Inc. located in Norwalk, Connecticut, and the pulser control unit 45 is a model FC100 controller manufactured by the same corporate entity. Additionally, while the nozzles 41 are schematically illustrated as being horizontally oriented, they are more preferably canted at a 30 angle with respect to the upper surface of the tubesheet 7 so as to minimize the momentary forces that the shock waves created by the pulses of gas apply to the heat exchanger tubes 9 nearest the open ends of the nozzle 41. Preferably, the firing cylinder of each of the pressure pulse generators 39 contains between 75 and 100 cubic inches of pressurized gas.

Figure 3:
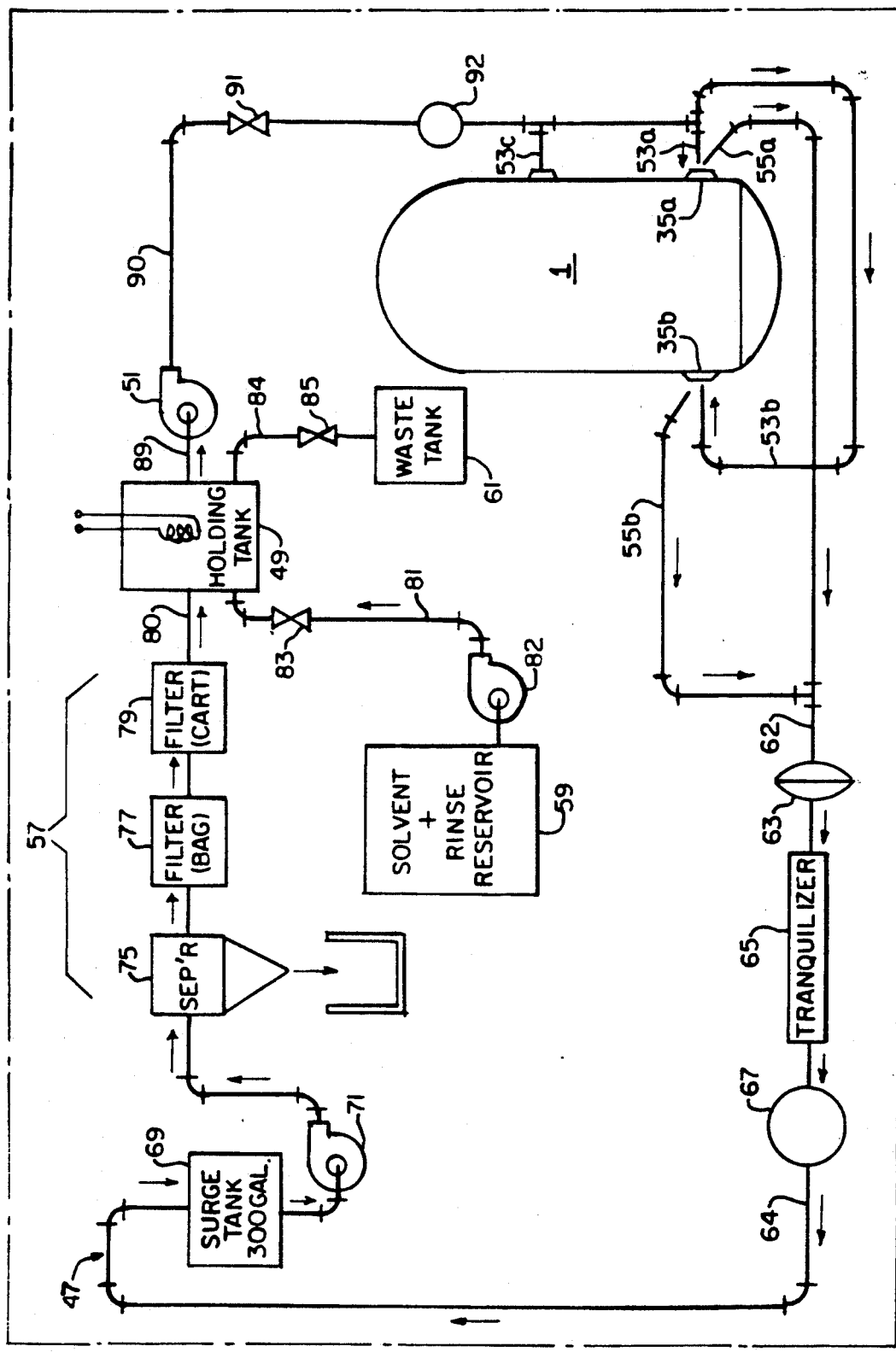
FIG. 3 is a more detailed schematic diagram of the recirculation system used to implement the method of the invention.

With reference now to both FIGS. 1 and 3, the recirculation system 47 that is preferably used to implement the method of the invention generally comprises a holding tank 49 for holding and heating the liquid chemical cleaning agents circulated through the secondary side 5 of the generator 1, a circulation pump 51 for creating the pressure differential necessary to circulate such cleaning agents into and out of the secondary side 5, and three inlet conduits 53a,b,c for introducing the liquid chemical cleaning agent through the hand holds 35a,b and upper manways 37 of the secondary side 5. Further included are a pair of outlet conduits 55a,b for removing liquid chemical cleaning agents from the interior of the secondary side 5, a filter bank 57 for removing undissolved sludge and debris entrained in the liquid agents removed from the secondary side 5, a solvent and rinse reservoir 59 for supplying chemical cleaning agents such as iron and copper solvents to the holding tank 49, as well as rinsing and passivation agents, and a waste tank 61 for collecting spent chemical agents from the holding tank 49.

FIG. 3 illustrates the recirculation system 47 in more detail. Specifically, outlet conduits 55a,b converge into a single inlet conduit 62 which in turn is connected to a diaphragm pump 63. The use of a diaphragm-type pump 63 is preferred at this point in the recirculation system 47 since the liquid cleaning agent withdrawn through the outlet conduits 55a,b may include large particles of suspended sludge and debris which, while easily handled by a diaphragm-type pump, could damage or even destroy a centrifugal or positive displacement pump. The outlet of the diaphragm 63 is connected to the inlet of a tranquilizer 65 by way of conduit 64. The purpose of the tranquilizer 65 is to even out the pulsations in the liquid chemical agent created by the diaphragm pump 63 so that a flow meter 67 located downstream of the tranquilizer 65 can reliably indicate the rate of flow of liquid chemical cleaning agent through the conduit 64. Located downstream of flow meter 67 is a surge tank 69. The purpose of the surge tank 69 is to accumulate the flow of liquid cleaning agent generated by the diaphragm pump 63 and to smoothly deliver it to the inlet of recirculation pump 71. The pump 71 in turn generates a sufficient pressure head in the recirculating chemical agents to drive it through the filter bank 57, which includes a cyclone separator 75, a bag filter 77, and a cartridge filter 79, when the agent enters the filter bank 57, a substantial portion of the sludge and other debris suspended in the agent is centrifugally flung out of the agent as it flows through the cyclone separator 75. Located downstream of the cyclone separator 75 is the one to three micron bag filter 77 that is serially connected to the one micron cartridge type filter 79. These filters 77 and 79 remove any small particulate matter which still might be suspended in the agent after it passes through the cyclone separator 75.

A conduit 80 connects the filter bank 57 to the inlet of the previously mentioned holding tank 49. As is schematically illustrated in FIG. 3, the holding tank 49 includes at least one heater coil for heating the recirculating chemical agent to a desired temperature. As has been previously indicated, the holding tank 49 is connected to a solvent and rinse reservoir 59 by means of a conduit 81. A pump 82 is provided in the conduit 81 for generating the pressure differential necessary to transfer the contents of the reservoir 59 into the holding tank 49. A valve 83 is further provided in the conduit 81 for regulating the flow of fresh cleaning agents or rinsing agents into the holding tank 49. The waste tank 61 is connected to the holding tank 49 by means of a conduit 84. If the level of liquid within the waste tank 61 can be made to be lower than the level of liquid in the holding tank 49, no pump is necessary in the conduit 84 as the contents of the tank 49 can be made to drain into the tank 61. A valve 85 is provided in the conduit 84 to control the rate of such draining. The purpose of the waste tank 61 is to remove spent cleaning and rinsing agents from the holding tank 49, and to temporarily "park" these agents until such time as they may be disposed of properly. Finally, the holding tank 49 communicates with the previously mentioned recirculation pump 51 by way of an outlet conduit 89. The outlet of the pump 51 is in turn connected to outlet conduit 90 which communicates with the previously mentioned generator inlet conduits 53a,b,c by way of another flow meter 92.

In the first step of the method of the invention, the steam generator 1 is taken off line and all water is drained out of both the primary and secondary sides 3,5. Next, a technique known in the art as sludge lancing is employed to remove loose deposits of sludge that have accumulated over the tubesheet 7 of the steam generator 1. Sludge lancing involves the use of a high velocity jet of water to dislodge and flush out this sludge. There are two advantages associated with the implementation of a sludge-lancing step at this juncture. First, the removal of the three to four inches of sludge that is typically present over the tubesheet 7 prior to the initiation of the chemical cleaning steps of the method allows the chemical cleaning agents to have at least some access to the crevice regions of the tubesheet 7. Without such sludge-lancing.. the thick layer of sludge that is normally present at this location would effectively insulate the tubesheet 7 from such cleaning agents. A second advantage that follows from such sludge lancing is that the potency of the active chelate compounds in the chemical cleaning agents is not unnecessarily wasted on metals and metal compounds that can be relatively easily and quickly removed by mechanical cleaning techniques. This in turn allows the chemical strength of these compounds to be concentrated at the crevice regions in the tubesheet and at the support plate interfaces within the secondary side 7, where such strength is needed most.

After the sludge lancing step has been completed, one or more chemical cleaning agents is introduced into the interior of the secondary side 5 of the steam generator 1. In the instant example of the method of the invention, a chelate-containing iron solvent is first introduced into the secondary side 7, followed by at least one iron solvent rinse, which is in turn followed by a chelate-containing copper solvent. After such a copper solvent has been applied, a copper rinse is used to remove all residual traces of the chelate-containing copper solvent, which in turn is followed by a final cleanup rinse. After all of the cleanup rinse has been removed from the interior of the secondary side, a passivation agent is finally introduced into the secondary side 5, whose purpose is to build up a thin, protective layer of oxide on all of the metal surfaces within the secondary side 5 so as to render them more resistant to corrosion. As will be described in more detail shortly, pressure pulsing is performed during the introduction and removal of each solvent and rinse agent in order to advantageously contract the time required for the chemical cleaning of the secondary side 5.

In this example, the sludge deposits are assumed to be heavy, and the composition of the sludge in the secondary side 5 is assumed to be between 70–80% by weight iron compounds, and 20–30% by weight copper compounds. Moreover, the composition, concentration, and temperatures of the iron and copper solvents, iron and copper rinses, cleanup rinse and passivation agent are as follows:

TABLE 1

| Iron Solvent | Iron Rinse |
| --- | --- |
| 150 ± 20 g/L EDTA | pH 10.0 ± 0.2 with NH$_4$OH |
| 1.0 ± 0.2% Hydrazine | Used for Cooldown |
| pH 6.8 ± 0.2 with NH$_4$OH | |
| 0.75 ± 0.1% CCI-801 | |
| 200 ± 5° F. (93 ± 2° C.) | |
| Copper Solvent | Copper Rinse |
| 50 ± 10 g/L EDTA | 10 ± 5 ppm Hydrazine |
| pH 7.0 ± 0.5 with NH$_4$OH | pH 10.0 ± 0.2 with NH$_4$OH |
| pH 9.5 ± 0.2 with EDA | Used for Heatup |
| 3.0 ± 0.2% H$_2$O$_2$ | |
| 100 + 0, −5° F. (38 + 0, −2° C.) | |

In the next step of the method of the invention, an iron solvent whose composition is set forth above is transferred from the solvent and rinse reservoir 59 to the holding tank 49 via conduit 81 by opening valve 83 and actuating pump 82. The heater coil within the holding tank 49 is actuated to bring the temperature of the iron solvent to 200° F. or slightly greater. As soon as the desired temperature is attained, valve 91 is opened, and recirculation pump 51 is actuated so that the heated iron solvent is conducted through the outlet conduit 90, through, flow meter 92 and finally into inlet conduits 53a,b,c. As soon as the level of the iron solvent within the secondary side 5 of the steam generator 1 is high enough to completely immerse the nozzle 41 of each of the pressure pulse generators 39 under approximately three feet of liquid, the pressure pulse generators 39 are discharged at a rate of once every 7–15 seconds (and preferably about once every ten seconds) in order to discharge a pressurized pulse of nitrogen or other inert gas into the iron solvent at a pressure of about 600 psi.

As the level of the iron solvent rises, the discharge pressure used in the pressure pulse generators 39 is increased to about 900psi when the level of the iron solvent within the secondary side 5 has reached its highest level, at which time it substantially submerges all but the bent portions of the U-shaped heat exchanger tubes 9. The iron solvent is then allowed to circulate through the recirculation system 47 while at its maximum level within the secondary side 5 for a period of between about 2 and 12 hours. All during this time, the pressure pulse generators 39 continue to discharge pulses of pressurized nitrogen in the iron solvent circulating within the secondary side 5 at a frequency of about once every ten seconds. Finally, the iron solvent is drained from the secondary side 5 by accumulating it within the holding tank 49 and then discharging it into the waste tank 61 through conduit 84 and valve 85. All during this time, the pressure of the gas used in the pressure pulse generators 39 is lowered from 900 to about 600 psi until there is only about three feet of solvent standing over the nozzles 41 of the generator 39.

Since the filling and the draining portions of this step of the method take about two hours apiece, the total time required for the introduction, circulation and removal of the iron solvent from the secondary side 5 takes between 6 and 16 hours. This time is substantially shorter than the normal residence time for such an iron solvent without pressure pulsing, which can last any where between 13 and 70 hours. The substantial shortening of time advantageously results from the loosening, dislodgment and fluidization of the insoluble components of the sludge, corrosion products, and other debris as the chelate within the iron solvent dissolves the magnetite and elemental iron. component of the sludge and debris, thereby giving the iron solvent continuous free access to the sludge being removed. This is a particularly important mechanism in crevice regions such as the previously described annular space 30 between the heat exchanger tubes 9 and the bores 28 within the support plates 26, where the static retention of the insoluble components of the sludge and other debris can retard if not stop altogether the dissolution of the magnetite and elemental iron by the iron solvent. A related mechanism which is further believed to accelerate the removal of the magnetite and elemental iron is the fact that the shock waves generated by the pressure pulse generator 39 are capable of cracking or otherwise generating fissures in accumulations of sludge and debris that are not initially dislodged and fluidized by these pulses. The generation of such cracks and fissures increases the amount of surface area within these accumulations that comes into contact with the iron solvent, thereby hastening its dissolution. Other helpful mechanisms include the continuous circulation of the iron solvent within the secondary side 5 by the recirculation system 47, coupled with the continuous, localized agitation of this solvent by the pressure pulse generators 39. The agitation that results from these activities prevents any localized areas of depleted solvent from occurring in any of the areas of the secondary side 5 which promote poor circulation, such as the previously described crevice regions. Still another speed enhancing mechanism is the fact that the extreme agitation of the solvent afforded by the pressure pulse generators 39 helps to mechanically promote the dissolution of hard-to-dissolve components within the sludge and other debris. The aggregate effect of all of these advantageous mechanisms not only shortens the amount of time necessary to conduct the iron solvent bath; it further advantageously obviates the need for a second such iron solvent bath which was typically required in the prior art for a sludge having the aforementioned characteristics.

After the iron solvent has been completely removed from both the secondary side 5 of the generator 1, and the holding tank 49, an iron solvent rinse having a composition as previously described is admitted into the holding tank 49 and from thence into the interior of the secondary side 5. The purpose of the iron solvent rinse is to remove any residual amounts of iron solvent which still may be present within the secondary side 5. For this purpose, the heating coil within the holding tank 49 is deactuated, as the solvent is admitted into the generator 1 at ambient or only slightly elevated temperature (95° –140° F.) in order to cool down the secondary side 5 in preparation for the admission of the copper solvent. The filling and draining of the secondary side 5 with the iron solvent rinse is preferably achieved within four to eight hours. Again, the pressure pulsers 39 are operated in the same manner as described with respect to the iron solvent from the time that the nozzle 41 of each is covered by about three feet of rinse during the filling operation to the time when the level of the rinse falls back to this level when the rinse is removed from the secondary side 5. While the use of the pressure pulse generators 39 does not significantly contract the time expended for the iron solvent rinsing step over the prior art, the use of the pressure pulse generators 39 during this step advantageously continues to dislodge, fluidize and remove particles of sludge which would otherwise remain in the secondary side 5 if no pressure pulsing were administered.

In the next step of the method of the invention, a copper solvent is admitted from the solvent and rinse reservoir 59 to the holding tank 49. This solvent is preferably heated to a temperature of approximately 100° F. before being admitted into the secondary side 5 of the steam generator 1. The composition of the copper solvent is as has been previously indicated and the total time necessary for filling, recirculating and draining the solvent is between about 4 to 16 hours in the method of the invention. Of course, pressure pulsing is conducted simultaneously with the fill, recirculation and drain operations in the same manner as was described with respect to the iron solvent, with the exception that air is used in lieu of nitrogen in order to oxidize the chelate in the solvent. The 4–16 hour length of this step of the method contrast favorably with the 6–24 hours normally required for a copper solvent bath. Moreover, because of all the aforementioned loosening, dislodgment and fluidization mechanisms, only one such copper solvent bath is necessary in this example of the method of the invention. This contrasts favorably with the prior art, as prior art chemical cleaning methods typically administer two to six separate copper baths in the secondary side 5 of the generator 1 for heavy sludge deposits that are 20-30% by weight copper compounds.

After both the secondary side 5 and the holding tank 49 have been drained of copper solvent, a copper solvent rinse having a composition as previously described is admitted into the secondary side, allowed to circulate, and finally removed, the entire procedure taking between four to eight hours. Again, while there is no significant contraction in the amount of time allocated for the copper rinsing step as compared to prior art, significantly greater amounts of sludge, debris and corrosion products are removed during the copper rinse step of the invention due to the continuous operation of the pressure pulse generators 39 and the continuous recirculation of the rinse by the recirculation system 47 and continuous removal of these materials from the rinse by the filter bank 57.

After both the secondary side 5 and the holding tank 49 have been drained of copper rinse, a final cleanup rinse having a composition as previously set forth is admitted into the secondary side 5, where it is recirculated and then removed. Total amount of time allocated for this step is four to eight hours, which, like the copper rinse step, is not significantly different than prior art chemical cleaning processes. However, as was the case with both the copper rinse and iron rinse steps, the continuous operation in the pressure pulse generator 39 during this step again results in the removal of significantly greater amounts of sludge, debris and corrosion products from the interior of the secondary side 5 than the prior art.

In the final step of the chemical cleaning method of the invention, a passivation agent is admitted, recirculated and removed from the secondary side 5. The composition of this agent is as has been previously described and its purpose is to create a protective, thin oxide coating on all the exposed metal surfaces within the secondary side 5 in order to retard the occurrence of future corrosion. The total amount of time taken for this step is preferably between about 24 and 36 hours. Again, while there is no significant reduction in the amount of time required in the passivation step of the invention versus the passivation step of prior art chemical cleaning methods, the continuous use of pressure pulse generators 39 during this step, coupled with the continuous recirculation of the liquid agent through the filter bank 57 again results in the removal of significantly greater amounts of sludge, debris and corrosion products that is associated with the prior art.

While the chemical cleaning method of the invention has been described within the context of the most popular and widely accepted iron and copper solvents in use in the United States today in conventional chemical cleaning methods, it should be noted that it is generally applicable to any chemical cleaning method which employs chelates such as 5-20% aqueous mixtures of EDTA, or organic acids, such as 2-10% aqueous mixtures of NTA (nitrilo triacetic acid). The method is further applicable, but not limited to the following specific aqueous mixtures of chemicals for dissolving iron, copper and magnetite:

TABLE 2

| Solvent | pH | Adjusted with |
|---|---|---|
| 10% EDTA | 7.0 | NH$_4$OH |
| 10% EDTA | 4.2 | NH$_4$OH |

TABLE 2-continued

| Solvent | pH | Adjusted with |
|---|---|---|
| 10% EDTA-1% N$_2$H$_4$ | 4.5 | NH$_4$OH |
| 10% EDTA-1% N$_2$H$_4$ | 7.0 | NH$_4$OH |
| 10% EDTA-1% N$_2$H$_4$ | 9.0 | NH$_4$OH |
| 10% EDTA-2% Ammonium Oxalate | 7.0 | NH$_4$OH |
| 10% EDTA-2% Ammonium Oxalate | 4.1 | NH$_4$OH |
| 9% EDTA-4% Oxalic Acid | 4.2 | NH$_4$OH |
| 7.5% EDTA-3% Glycolic Acid-1% N$_2$H$_4$ | 6.0 | NH$_4$OH |
| 5% EDTA-2% Glycolic Acid-4% Ascorbic Acid | 4.2 | NH$_4$OH |
| 5% EDTA-2% Glycolic Acid-4% Ascorbic Acid | 7.0 | NH$_4$OH |
| 8% EDTA-4% Citric Acid | 4.3 | NH$_4$OH |
| 8% EDTA-4% Citric Acid-1% N$_2$H$_4$ | 4.2 | NH$_4$OH |
| 8% EDTA-4% Citric Acid-5% Ascorbic Acid | 4.2 | NH$_4$OH |
| 8% EDTA-4% Citric Acid-1% N$_2$H$_4$ | 6.6 | NH$_4$OH |
| 8% EDTA-4% Tartaric Acid | 4.0 | NH$_4$OH |
| 5% EDTA-5% Phthelic Anhydride | 5.3 | NH$_4$OH |
| 10% EDTA-1% N$_2$H$_4$-5% Maloic Acid | 4.2 | NH$_4$OH |
| 10% EDTA-1% N$_2$H$_4$-2% Citric Acid 2% Maleic | 4.2 | NH$_4$OH |
| 3% EDTA.-3% Adipic Acid-0.6% Citric Acid | 4.6 | NaOH |
| 6% EDTA-6% Adipic Acid-1.2% Citric Acid | 4.0 | NaOH |
| 0.5% Na$_2$ EDTA-2% Citric-5% Dibasic Citric | 5.0 | — |
| 0.5% Na$_2$ EDTA-2% Citric-5% Dibasic Citric | 4.1 | — |
| 0.1% Na$_2$ EDTA-3% Citric-7.5% Dibasic Citric | 4.2 | — |
| 9% Na$_4$ EDTA-1% Na$_3$ NTA | 12.2 | — |
| 9% EDTA-1% NTA | 7.0 | N$_4$OH |
| 9% EDTA-1% NTA | 7.0 | NH$_4$OH |
| 9% EDTA-1% NTA | 4.2 | NH$_4$OH |
| 1% EDTA-9% NTA | 4.2 | NH$_4$OH |
| 10% HEDTA | 4.0 | NH$_4$OH |
| 10% HEDTA-1% N$_2$H$_4$ | 4.0 | NH$_4$OH |
| 10% HEDTA-1% N$_2$H$_4$ | 7.0 | NH$_4$OH |
| 14.5% DTPA | 4.0 | N$_2$H$_4$ |
| 14.5% DTPA-1% N$_2$H$_4$ | 4.0 | NH$_4$OH |
| 14.5% DTPA-1% N$_2$H$_4$ | 7.0 | NH$_4$OH |
| 14.5% DTPA-5% Ascorbic Acid | 4.0 | NH$_4$OH |
| 10% DTPA-2% Citric Acid-1% N$_2$M$_4$ | 4.0 | NH$_4$OH |
| 10% DTPA-2% Citric Acid-1% N$_2$H$_4$ | 7.0 | NH$_4$OH |
| 6.5% Citric Acid | 3.5 | NH$_4$OH |
| 10% Citric Acid | 3.5 | NH$_4$OH |
| 10% Citric Acid | 6.0 | NH$_4$OH |
| 4% Citric Acid-2% Formic Acid | 2.05 | — |
| 5.5% Phthalic Acid | 5.5 | H$_2$H$_4$ |
| 5% Adipic Acid | 4.0 | N$_2$H$_4$ |
| 4% Glycolic Acid-2% Citric Acid | 2.3 | — |
| 4% Glycolic Acid-2% Formic Acid | 2.3 | — |
| 4% Glycolic Acid-2% Formic-5% Ascorbic | | — |
| 7% Oxalic Acid-3% Citric Acid | 4.5 | NH$_4$OH |

It should further be noted that the type of solvents used (i.e., whether iron or copper), and the number and sequence of solvent baths and rinses employed will depend upon the composition of the sludge. For sludge having less than 5% by weight of copper and copper compounds, it may not be necessary to separately administer a copper solvent at all. For sludges having very high percentages of copper compounds (30-60%), more than one copper solvent bath may be necessary. The number of solvent baths will also depend on the amount of sludge present within the crevice regions. Hence generators with heavy sludge deposits (i.e., over 600 lbs. in the secondary side) will require fewer baths of all solvents than generators having light sludge deposits (i.e., less than 300 lbs.). However, in all cases, the number of baths required will be at least half as much as would normally be required without the simultaneous use of pressure pulsing.

I claim:

1. An improved method for removing sludge and corrosion products from the interior of a heat exchanger vessel of the type wherein a liquid chemical cleaning agent is introduced into said vessel for a normal residence time of t minutes and then removed, and wherein said agent promotes corrosion within the interior of said heat exchanger vessel, wherein the improvement comprises the steps of:

generating a series of pressure pulses within the liquid agent after said agent has been introduced into the interior of said vessel to create shock waves in said liquid agent to dislodge, dissolve and fluidize said sludge and corrosion products, and removing said liquid chemical cleaning agent after 10 to 67% of said normal residence time to substantially shorten the time required for the removal of the sludge and corrosion products from said vessel, and to reduce new corrosion from the chemical agent in said vessel by a factor which is greater than the percentage that the residence time is reduced.

2. An improved method as defined in claim 1, wherein said pressure pulses are generated at a frequency of one pulse every 5 to 15 seconds.

3. An improved method as defined in claim 1, wherein said pulses are created by injecting pulses of gas into the liquid chemical agent at a pressure between about 300–900 psi.

4. An improved method as defined in claim 1, wherein said series of pressure pulses are created by pulses of gas discharged from a pressure pulse generator detachably mounted at a lower portion of the interior of the heat exchanger vessel, and wherein the generation of said pressure pulses commences as soon as said generator is submerged in liquid cleaning agent.

5. An improved method as defined in claim 1, wherein said series of pressure pulses are created by pulses of gas discharged from a pressure pulse generator detachably mounted at a lower portion of the interior of the heat exchanger vessel, and wherein the generation of said pressure pulses continues as said cleaning agent is removed until said generator is no longer submerged under said agent.

6. An improved method as defined in claim 4, wherein the pressure of the gas discharged from the pressure pulse generator increases as the level of chemical cleaning agent within said vessel rises.

7. An improved method as defined in claim 5, wherein the pressure of the gas discharged from the pressure pulse generator decreases as the level of chemical cleaning agent within said vessel falls.

8. An improved method as defined in claim 1, wherein the method involves serially introducing chelate-containing cleaning agents n times into said vessel for normal residence times of t, ....tn each, and wherein the improvement comprises removing each of said chelate-containing cleaning agents from said vessel after 10 to 70% of each of said normal residence times.

9. An improved method as defined in claim 1, wherein the heat exchanger vessel is a nuclear steam generator having a radioactive interior, and the method involves serially introducing chelate-containing cleaning agents n times into said vessel, and wherein the improvement comprises serially introducing said chemicals only 0.5n times or less to reduce the total volume of radioactive liquid waste resulting from used chelate-containing cleaning agents.

10. An improved method as defined in claim 1, wherein said liquid chemical cleaning agent is a chelate-containing agent that requires the addition of an oxidation agent within said vessel, and wherein said pressure pulses are generated by discharging a gas that includes oxygen to facilitate the oxidation of said liquid chemical cleaning agent.

11. An improved method for removing sludge and corrosion products from the interior of a heat exchanger vessel of the type having a tubesheet, heat exchanger tubes, support plates, and crevice regions between said tubes and said tubesheet and support plates, wherein said method involves the introduction of a liquid chelate-containing cleaning agent into the interior of the vessel for a residence time of t minutes to dissolve sludge and corrosion products from said crevice regions, and said liquid cleaning agent promotes corrosion within the interior of said heat exchanger vessel, wherein the improvement comprises the steps of:

generating a series of pressure pulses within the liquid agent after said agent has been introduced into the interior of said vessel to create shock waves in said liquid to dislodge, dissolve and fluidize said sludge and corrosion products in said crevice regions and other areas and to force a circulation of said agent through said crevice regions;

recirculating said liquid cleaning agent through a filter means to remove dislodged and fluidize sludge and corrosion products from said agent both to prevent said sludge and products from resettling back into the interior surface of said vessel and to maintain the strength of said agent, and removing said liquid chemical cleaning agent after 10 to 46% of said normal residence time to substantially shorten the time required for the removal of the sludge and corrosion products from said vessel, and to reduce the new corrosion from the chemical agent in said vessel by a factor which is greater than the percentage that the residence time is reduced.

12. An improved method as defined in claim 11, wherein the method involves serially introducing liquid chemical cleaning agents in times into said vessel for normal residence times of t, ...tn each, and the improvement comprises removing each of said liquid chemical cleaning agents from said vessel after 10 to 70% of each of said normal residence times.

13. An improved method as defined in claim 12, wherein the interior of the heat exchanger vessel is radioactive, and the improvement further comprises reducing the number of times that said liquid, chelate-containing chemical cleaning agents are introduced into the vessel from n to 0.5n times or less to reduce the total volume of liquid radioactive waste resulting from used chelate-containing cleaning agents.

14. An improved method as defined in claim 12, wherein said cleaning agents include an iron solvent and a copper solvent, each of which is individually introduced and removed from said vessel.

15. An improved method as defined in claim 14, wherein the residence times of each of said iron solvent and said copper solvent are shortened to 10–30% of their normal residence times.

16. An improved method as defined in claim 14, further including the steps of introducing and removing an iron solvent rinse agent and a copper solvent rinse agent after iron and copper solvent has been removed from the heat exchanger vessel for the last time, respectively.

17. An improved method as defined in claim 11, wherein said chelate-containing chemical cleaning agent requires the addition of an oxidation agent within said vessel, and wherein said pressure pulses are generated by discharging a gas that includes oxygen to facilitate the oxidation of said liquid chemical cleaning agent.

18. An improved method as defined in claim 11, wherein said series of pressure pulses are created by pulses of gas discharged from a pressure pulse generator detachably mounted at a lower portion of the interior of the heat exchanger vessel, and wherein the generation of said pressure pulses commences as soon as said generator is submerged in liquid cleaning agent.

19. An improved method as defined in claim 11, wherein said series of pressure pulses are created by pulses of gas discharged from a pressure pulse generator detachably mounted at a lower portion of the interior of the heat exchanger vessel, and wherein the generation of said pressure pulses continues as said cleaning agent is removed until said generator is no longer submerged under said agent.

20. An improved method as defined in claim 19, wherein the pressure of the gas discharged from the pressure pulse generator increases as the level of chemical cleaning agent within said vessel rises.

21. An improved method for removing sludge and corrosion products from the interior of the secondary side of a nuclear steam generator having a tubesheet, heat exchanger tubes, support plates, and crevice regions between said tubes and said tubesheet and support plates, wherein said method involves the serial introduction and removal from said secondary side of a plurality of chelate containing cleaning agents which promote corrosion within the interior of the steam generator, including an iron solvent for a residence time of between about 13-70 hours, and a copper solvent for a residence time of between about 6-24 hours, wherein the improvement comprises:
generating a series of pressure pulses within the liquid cleaning agent after each agent has been introduced into the secondary side, and
serially maintaining said iron solvent in said secondary side for a period of between about 6-16 hours, and said copper solvent rinse for a period of about 4 hours to substantially shorten the time required for the removal of the sludge and corrosion products from said secondary side and to reduce the new corrosion from the chemical agent in said secondary side by a factory which is greater than the percentage that the residence time is reduced.

22. An improved method as defined in claim 21, further including the step of recirculating each of said cleaning agents through a filter means during the residence time of each of said cleaning agents to remove dislodged and fluidized sludge and corrosion products from said agent both to prevent said sludge and products from re-settling back into the interior surface of said secondary side and to maintain the strength of said agent, and removing each of said liquid chemical cleaning agents after 10 to 70% of said normal residence time.

23. An improved method as defined in claim 21, wherein the improvement further includes the step of generating said series of pressure pulses with an oxygen containing gas during the residence time of said copper solvent to oxidize said solvent.

24. An improved method as defined in claim 21, wherein said pressure pulses are generated at a frequency of one pulse every 5 to 15 seconds.

25. Am improved method as defined in claim 21, wherein said pulses are created by injecting pulses of gas into the liquid chemical agent at a pressure between about 300–900 psi.

26. An improved method for removing sludge and corrosion products from the radioactive interior of the secondary side of a steam generator of the type wherein liquid chemical cleaning agents are serially introduced into said secondary side n times for normal residence times of $t_1, t_2, \ldots t_n$ minutes each and them removed, and wherein said agents promote corrosion within said secondary side, wherein the improvement comprises the steps of:
generating a series of pressure pulses within each liquid agent after each said agent has been introduced into the interior of said secondary side to create shock waves in said liquid agent to dislodge, dissolve and fluidize said sludge and corrosion products, and
removing each of said liquid chemical cleaning agents after 10 to 70% of its normal residence time to substantially shorten the time required for the removal of the sludge and corrosion products from said secondary side and to reduce the new corrosion from the chemical agent in said secondary side by a factor which is greater than the percentage that the residence time is reduced, and
serially introducing said liquid chemical cleaning agent only 0.5n times or less to reduce the total volume of radioactive liquid waste resulting from used cleaning agents.

27. An improved method for removing sludge and corrosion products from the radioactive interior of the secondary side of a steam generator of the type wherein liquid chemical cleaning agents are serially introduced into said secondary side n times for normal residence times of $t_1, t_2, \ldots t_n$ minutes each and then removed and wherein said liquid cleaning agents promote corrosion within said interior, wherein the improvement comprises the steps of:
generating a series of pressure pulses within each liquid agent after each said agent has been introduced into the interior of said secondary side to create shock waves in said liquid agent to dislodge, dissolve and fluidize said sludge and corrosion products, and
removing each of said liquid chemical cleaning agents after less than its normal residence time to shorten the time required for the removal of the sludge and corrosion products from said secondary side and to reduce new corrosion from the chemical agent in said secondary side by a factor which is greater than the percentage that the residence time is reduced, and
serially introducing said liquid chemical cleaning agents only 0.5n times or less to reduce the total volume of radioactive liquid waste resulting from used cleaning agents.

* * * * *